(12) United States Patent
Mittereder et al.

(10) Patent No.: US 6,820,841 B2
(45) Date of Patent: Nov. 23, 2004

(54) ARRANGEMENTS FOR THE DE-ICING, ANTI-ICING AND DECONTAMINATION OF AIRCRAFT OR OTHER VEHICLES

(76) Inventors: P. Nicholas Mittereder, 37 Cannongate Dr., McDonald, PA (US) 15057; John M. Goston, 4650 Rosina Way, Pittsburgh, PA (US) 15224

( * ) Notice: Subject to any disclaimer, the term of this patent is extended or adjusted under 35 U.S.C. 154(b) by 45 days.

(21) Appl. No.: 10/126,454

(22) Filed: Apr. 19, 2002

(65) Prior Publication Data

US 2003/0042365 A1 Mar. 6, 2003

Related U.S. Application Data

(60) Provisional application No. 60/315,784, filed on Aug. 28, 2001.

(51) Int. Cl.[7] .............................................. B64D 15/00
(52) U.S. Cl. ............................. 244/134 R; 244/134 C
(58) Field of Search ...................... 244/134 R, 134 C, 244/12; 366/151.2, 184; 169/16, 14; 238/131, 172

(56) References Cited

U.S. PATENT DOCUMENTS

| | | | |
|---|---|---|---|
| 4,191,348 A | | 3/1980 | Holwerda |
| 4,333,607 A | | 6/1982 | Mueller et al. |
| 4,573,802 A | * | 3/1986 | Kerrigan et al. |
| 4,723,733 A | | 2/1988 | McClinchy |
| 4,842,005 A | | 6/1989 | Hope et al. |
| 4,986,497 A | | 1/1991 | Susko |
| 5,028,017 A | | 7/1991 | Simmons et al. |
| 5,096,145 A | | 3/1992 | Phillips et al. |
| 5,104,068 A | | 4/1992 | Krilla et al. |
| 5,161,753 A | | 11/1992 | Vice et al. |
| 5,242,133 A | | 9/1993 | Zwick |
| 5,244,168 A | * | 9/1993 | Williams ................. 244/134 R |
| 5,454,532 A | | 10/1995 | Whitmire |
| 5,490,646 A | | 2/1996 | Shaw et al. |
| 5,845,848 A | * | 12/1998 | Amako et al. .......... 244/134 C |
| 6,029,934 A | | 2/2000 | Foster |
| 6,045,092 A | | 4/2000 | Foster |
| 6,134,734 A | | 10/2000 | Marrero |
| 6,209,823 B1 | | 4/2001 | Foster |
| 6,547,187 B2 | * | 4/2003 | Foster .................... 244/134 C |

* cited by examiner

Primary Examiner—Charles T. Jordan
Assistant Examiner—L. Semunegus
(74) Attorney, Agent, or Firm—Reed Smith LLP

(57) ABSTRACT

Systems in which anti-icing fluids may be automatically mixed with water, and by which de-icing fluids may be heated and mixed with water, to provide variable temperatures and ratios of de-icing fluid-to-water to local aircraft de-icing fluid application devices in an instantaneous manner. Also contemplated herein are systems that additionally are configured for applying decontamination fluid and/or corrosion control fluid to military aircraft or other vehicles.

42 Claims, 2 Drawing Sheets

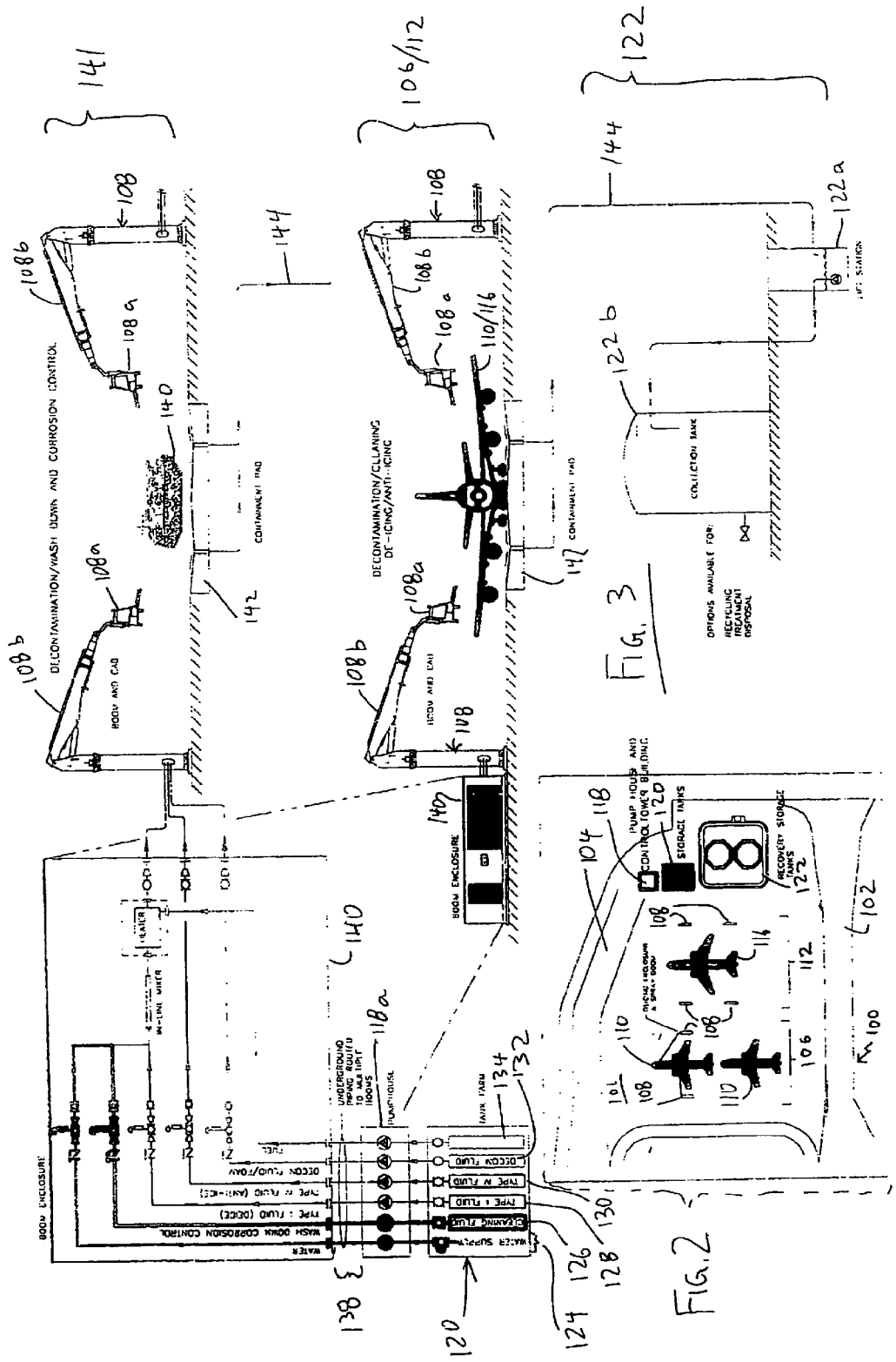

ARRANGEMENTS FOR THE DE-ICING, ANTI-ICING AND DECONTAMINATION OF AIRCRAFT OR OTHER VEHICLES

CROSS-REFERENCE TO RELATED APPLICATION

This application claims priority from U.S. Provisional Patent Application Ser. No. 60/315,784, filed on Aug. 28, 2001.

FIELD OF THE INVENTION

The present invention relates to de-icing systems at airports or airfields, wherein de-icing solution is applied to aircraft during cold weather. The present invention also relates to decontamination systems, wherein a decontamination medium is applied to aircraft, such as military aircraft, or to other vehicles.

BACKGROUND OF THE INVENTION

Conventional methods and arrangements for the de-icing and anti-icing of aircraft typically involve truck-based systems, whereby the airplane is positioned and the truck de-icers are maneuvered to begin spraying de-icing and/or anti-icing fluids on the planes. Typically, deicing fluid/water solutions are stored and/or mixed at a central location.

Conventional systems use a standard 50—50 de-icing fluid/water mixture regardless of weather conditions, plane conditions, etc. The 50—50 mixture is purchased in bulk quantities and stored at a central location. Conventional systems typically use de-icing tank trucks that fill at the central location, then drive to the de-icing areas (often at the gate aprons) to apply the fluids.

In view of the foregoing, a need has thus been recognized in connection with improving the efficiency of de-icing fluid use and with reducing potential adverse environmental impacts.

It is also the case that today, military units face growing threats in connection with terrorism and related acts of aggression. New demands are thus imposed on defense plans and plans of action, such that combat, transport and CRAF aircraft are bound to be affected. In this posture, a need has been recognized in connection with the development of a multi-functional, single-point system for the deicing, decontamination and corrosion control of such airframes.

SUMMARY OF THE INVENTION

In accordance with at least one presently preferred embodiment of the present invention, a choice of forced air and/or mixtures of varying proportions of de-icing fluid and water may be used to optimize the process as well as to reduce materials costs and environmental impacts. Other attendant advantages in include a reduction in the need for labor (as compared to truck-based or other conventional operations), an improvement in the consistency of the application of solutions of de-icing fluid and water as well as in quality control, and the capability of increasing the throughput of aircraft.

Thus, instead of mixing the de-icing fluid with water at a central location and sending the same mix to all aircraft being de-iced in the general area, it is broadly contemplated in accordance with at least one presently preferred embodiment of the present invention for a system to provide for the mixing of de-icing fluid into water at each set of booms. This allows for a more precise mix of fluids to be applied to individual planes, based on considerations associated with each plane, such as the specific amounts of snow/ice accumulation on a plane. In turn, this reduces the quantity of fluids used and precludes the need to dump fluids every time a change to the mix is desired, saving additional fluid costs and reducing potential adverse environmental impacts.

Also broadly contemplated herein is a system such as that just described which further incorporates a capability for the decontamination of aircraft and/or other vehicles (such as large military vehicles, e.g., tanks).

Generally, there is broadly contemplated in accordance with at least one presently preferred embodiment of the present invention a system for applying fluid to aircraft, the system comprising: at least one arrangement for directing fluid towards aircraft; an input arrangement for providing fluid to the at least one fluid directing arrangement; the input arrangement: comprising: an arrangement for facilitating the mixing of at least two fluids; and an arrangement for providing a mixture of at least two fluids to the at least one fluid directing arrangement; a control arrangement for selectably controlling the respective proportions of fluids in a mixture of at least two fluids, wherein the control arrangement is adapted to facilitate the selective provision of different fluid mixtures to different aircraft.

Further, there is broadly contemplated in accordance with at least one presently preferred embodiment of the present invention a system for applying fluid to military vehicles, the system comprising: at least one arrangement for directing fluid towards a military vehicle; an input arrangement for providing fluid to the at least one fluid directing arrangement; the input arrangement comprising: an arrangement for facilitating the mixing of at least two fluids, one of the at least two fluids comprising decontaminating fluid or cleaning fluid; and an arrangement for providing a mixture of at least two fluids to the at least one fluid directing arrangement; a control arrangement for selectably controlling the respective proportions of fluids in a mixture of at least two fluids, wherein the control arrangement is adapted to facilitate the selective provision of different fluid mixtures to different aircraft.

Additionally, there is broadly contemplated in accordance with at least one presently preferred embodiment of the present invention a method of applying fluid to aircraft, the method comprising the steps of: mixing at least two fluids; directing the mixture of at least two fluids towards aircraft; and selectably controlling the respective proportions of fluids in the mixture of at least two fluids, whereby the selective provision of different fluid mixtures to different aircraft is facilitated.

Furthermore, there is broadly contemplated in accordance with at least one presently preferred embodiment of the present invention a method of applying fluid to military vehicles, the method comprising the steps of: mixing at least two fluids, one of the at least two fluids comprising decontaminating fluid or cleaning fluid; directing the mixture of at least two fluids towards at least one military vehicle; and selectably controlling the respective proportions of fluids in a mixture of at least two fluids, whereby the selective provision of different fluid mixtures to different military vehicles is facilitated.

BRIEF DESCRIPTION OF THE DRAWINGS

The present invention and its presently preferred embodiments will be better understood by reference to the detailed disclosure hereinbelow and to the accompanying drawings, wherein:

FIG. 2 is a plan view of the layout of a de-icing and/or decontamination system at an airport or air field.

FIG. 3 schematically illustrates pertinent parts of the system of FIG. 2.

DESCRIPTION OF THE PREFERRED EMBODIMENTS

Figure 1:
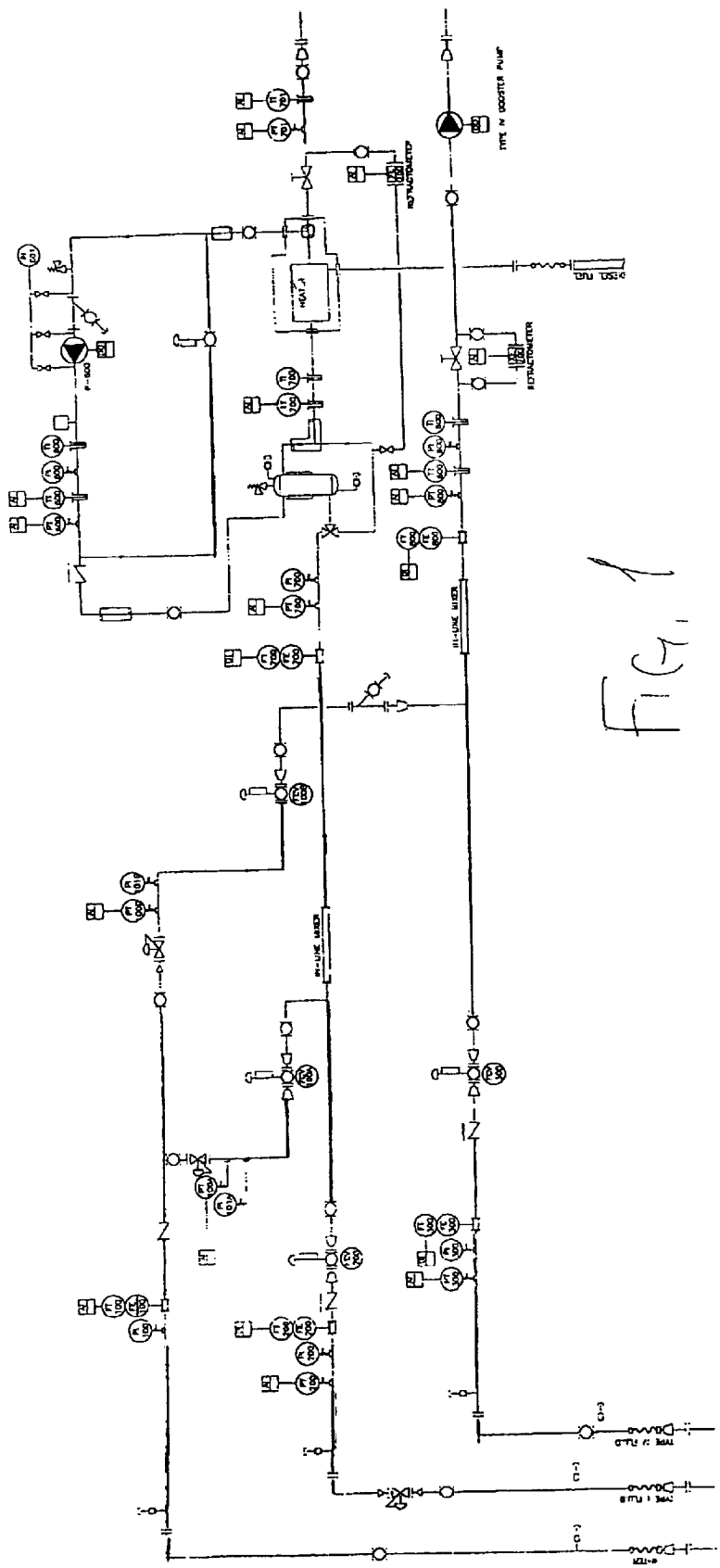
FIG. 1 schematically depicts a non-restrictive example of a system that may be located in the vicinity of individual booms.

Throughout the instant disclosure, it will be appreciated that several terms may be used interchangeably with one another, some of which are briefly discussed immediately below. Reference is first made to FIG. 1, which schematically depicts a non-restrictive example of a system that may be located in the vicinity of individual booms. Various aspects of the system shown in FIG. 1 will be further appreciated from the discussion of FIGS. 2 and 3 provided further below, along with reference to those Figures.

Broadly contemplated herein, in accordance with at least one preferred embodiment of the present invention, is a system by which anti-icing fluids may be automatically mixed with water, and by which de-icing fluids may be heated and mixed with water, to provide variable temperatures and ratios of de-icing fluid-to-water to local aircraft de-icing fluid application devices in an instantaneous manner. This system permits the de-icing fluid/water mixture to be directly controlled by the operators and to be optimized on a real-time basis, based on local weather conditions, individual aircraft snow/ice accumulations, pilot directive, and/or other airport criteria affecting de-icing/anti-icing operations.

In one embodiment, the system is integrated with fixed boom de-icing systems that are pneumatically driven and which provide an enclosed, conditioned cab for the operator. The boom/cab assembly may contain, for instance, systems that employ a hydraulic air blower and special application nozzles to remove snow accumulations from aircraft, using e.g. low pressure air at 700 MPH (miles per hour).

A de-icing system in accordance with at least one embodiment of the present invention may include:
the use of refractometers that provide precise measurement of the de-icing/anti-icing fluid-to-water proportions;
arrangements of automatic pressure regulating valves, flow control valves, and in-line fluid mixers to provide precise control of the fluid-water mixtures;
enclosures at the base of each fixed boom, which contain the fluid mixing systems, a fluid heater, hydraulic system, and a power source used to power the hydraulic boom and to power an air blower system with special nozzles for snow removal purposes; and
a master-slave control system between the two booms that ensures the same fluid mixtures are applied to each aircraft serviced by the pair of booms.

It will be appreciated that a primary feature of a system according to at least one embodiment of the present invention is that it provides local, instantaneous control of the fluid mixing for fixed boom de-icing/anti-icing systems serving individual airplanes. This stands in stark contrast to those conventional systems which only allow for the mixing of fluids as determined at a central control location, with the same de-icing fluid/water proportions delivered to all aircraft.

The mixing process and control are essentially "moved" from a central location serving all de-icing operations to each set (e.g., pair) of fixed de-icing booms serving an aircraft de-icing "slot". This allows the boom operator to control the process for each individual aircraft "slot". (Since each slot will likely have two or more booms to de-ice, one boom is preferably a "master" and the other[s] preferably act as a "slave" or "slaves", so that the same fluid mixture is applied to the aircraft in the slot between the booms).

As shown in FIG. 1, fast-acting outlet pressure regulators can preferably maintain a constant supply pressure to the water flow control valves shown (FCV-100A and FCV-100B).

Fast-acting outlet pressure regulators can also preferably maintain a constant supply pressure to the Type I and Type IV flow control valves shown (FCV-200 and FCV-300).

The mixing system will preferably have the capability to receive, control flow and pressure, record and monitor flow and pressure and mix inline water and Type I and Type IV fluids to programmed fluid concentrations. These types of fluids are well-known in the industry; Type I fluid is for deicing, i.e., the removal of snow, while Type IV fluid is for anti-icing, wherein ice is attended to but snow is permitted to still accumulate on the plane. The system will preferably interface with the controls for the boom/cab assembly associated with it. (The system outputs, indicated by the rightward-pointing arrows at the far right of FIG. 1, preferably feed into a suitable fluid delivery system, such as a boom-type delivery system, and are preferably controlled by the aforementioned boom/cab assembly controls.) Additionally, as shown, the system will preferably provide a recirculation system around the heater in order to maintain flow.

In mixing water with Type I Fluid, the water flow control valve (FCV-100A) and Type I flow control valve (FCV-200) will preferably modulate to control a predetermined mixture as indicated by the control system at a flow rate from 0 to 60 gpm (gallons per minute). The operator could vary the flow using, e.g., a foot control valve in the boom cab.

Preferably, the deicing pad control tower will convey the mixture required at a given time, for at least one given airplane, via communications medium to the local boom controls. The local control panel in the boom enclosure may, for instance, have a three position switch that establishes a basis for initiating a local mixture signal (e.g., emergency, normal, off). The "emergency" position may correspond to a mixture of 50/50 (which could then be adjustable by high level password or other security mechanism).

A wide range of mixture ratios will preferably be allowed for, such as between 100% water to 0% Type I and 70% Type I to 30% water.

A suitable refractometer (XE-700) located down stream of the recirculation loop can preferably provide an analog feedback signal indicating actual mixture back to the control system to complete the control loop. The signal is conveyed via the control system. A measured value relating to the composition of the mixture is indicated at the central control tower. The feedback process can preferably be automatic; while a desired ratio is initially input manually, any offset from this ratio as measured by the refractometers will preferably be corrected automatically via, for instance, changing different valve positions.

In mixing water with Type IV Fluid, the water flow control valve (FCV-100B) and Type IV Flow control valve (FCV-300) will preferably modulate to control a predetermined mixture as indicated by the control system at a flow rate of 20 GPM. Again, the operator may initiate flow using a foot control valve in the boom cab. A secondary Type IV booster pump may preferably be located downstream of the mixing station to produce a constant Type IV fluid supply without any lag time for flow at the nozzle.

The control tower may convey a required mixture via an analog signal to the boom enclosure controls. The local control panel in the boom enclosure may preferably have an additional three position switch that established a basis for initiating a local mixture signal (e.g., emergency, normal, off). The "emergency" position may correspond to a mixture ratio of 100% Type IV to 0% water.

A wide range of mixture ratios will preferably be allowed for, such as between 100% Type IV to 0% water and 75% Type IV to 25% water.

Again, a suitable refractometer (XE-800) can preferably provide an analog feedback signal indicating actual mixture back to the control system to complete the control loop.

The recirculation loop for the Type I fluid is provided to minimize the starting and stopping of the heater (which could be fueled by diesel fuel, natural gas or essentially any other suitable fuel). The tank bypass valve will preferably modulate to allow flow to circulate through the heater when a fall in fluid flow reaches 15 gpm as indicated by flow transmitter FT-700. The pump bypass valve will preferably bypass the heater when the foot pedal in the operator cab is depressed as sensed by a micro switch.

FIG. 1 illustrates and sets forth other components (all of which would appear to be well-known to those of ordinary skill in the art and, thus, warrant no further discussion herein) that may be utilized in a de-icing apparatus in accordance with an embodiment of the present invention. For instance, the "FT" components are flow transmitters, the "PT" components are pressure transmitters and the "TT" components are temperature transmitters. "PI", "FI", "AI", "DI" and "DO" relate, respectively, to pressure indicators, flow indicators, analog input, digital input and digital output.

The "in line mixers" may be embodied by essentially any suitable component capable of ensuring the efficient mixing of the disparate fluids that are meeting near each point in question. For instance, an in-line mixer may be embodied by a slightly larger diameter pipe with small rotor blades that help promote thorough mixing. The capsule-shaped component to the left of the heater is a recirculation tank and the L-shaped section of pipe between the recirculation tank and the heater is a relief valve pipe.

It will be appreciated that advantages associated with at least one embodiment of the present invention include the ability to use different fluid mixtures for different planes, based on the condition of each plane (amount of snow/ice accumulation, how long before the plane can take off, etc.), with the potential to further reduce operating costs by reducing the amount of de-icing and anti-icing fluids used.

For airports required to minimize de-icing and anti-icing fluid contamination of groundwater (due to environmental considerations), an airport could achieve significant savings in apron pad re-lining and fluid recovery systems costs by going to a centralized de-icing system vs. distributed apron de-icing operations.

The disclosure now turns to a discussion of a generalized anti-icing, de-icing and decontamination system in accordance with an embodiment of the present invention, as depicted in non-restrictive and illustrative fashion in FIGS. 2 and 3.

An integrated decontamination system may preferably include an aircraft deicing system such as that discussed heretofore, but configured to provide both deicing and decontaminant fluid mixing and application (where appropriate) as well as, preferably, a rinsing cycle, a fluid recovery system, and an effluent treatment system. Such a system would be capable of rapidly applying decontamination, deicing, or corrosion control solutions to aircraft, e.g., ranging from an F-16 fighter to a C-5 transport. The system could also be adapted to decontaminate commercial aircraft of the Civil Reserve Aircraft Fleet (CRAF) (i.e., aircraft called into action with commercial pilots, who may well seek assurances regarding the ability to safely decontaminate aircraft operating in hostile environments).

FIG. 2 schematically depicts an airport or airfield apron 100 on which is disposed an integrated de-icing/decontamination system. Indicated at 102 is an entry taxiway feeding into the de-icing/decontamination area 101, while indicated at 104 is a taxiway for exiting aircraft.

Broadly contemplated in accordance with at least one embodiment of the present invention are decontamination/de-icing/anti-icing stations 106 and 112 that may be configured to accept narrow-body aircraft 110 or wide-body aircraft 116, respectively. The former type of station (106) may preferably include a pair of boom units 108 while the latter type of station (112) may preferably include four such boom units 108.

Also preferably included in the general system layout are a pump house and control tower 118, storage tanks (e.g. a "tank farm") 120 and a recovery or recycling unit 122.

As shown in FIG. 3 a tank farm may include supplies of a variety of fluids which may include, but are not necessarily limited to: water 124, cleaning fluid 126, Type I fluid 128, Type IV fluid 130, decontamination fluid 132 and fuel 134 (which, as discussed above, could be diesel fuel, natural gas or any other fuel suitable for fueling a heater). Cleaning fluid 126 is preferably provided for wash-down or rinsing in either the context of a commercial airfield or in a military context (as will be further discussed herebelow). The cleaning fluid 126 used is preferably suitably chosen for the task or tasks at hand.

As shown, all fluids may preferably progress to a pumphouse 118*a* (which could be part of the same structure as a control tower for the de-icing/decontamination area 101) and thence through piping (preferably underground) indicated at 138 that leads to one or more boom enclosures 140 in the de-icing/decontamination area 101, or at other areas on the airport apron 100. It should be understood that suitably configured and branched pipes 138 may lead to several deicing/decontamination areas 101 on the airport/airfield apron 100. Preferably, within each of possibly several distinct deicing/decontamination areas 101 a single control tower (at 118) will be so configured and arranged to afford control over the mixture of fluids for each individual deicing/decontamination station 106/112 (each having a set of booms 108) in each area 101 (as further discussed herebelow).

Details relating to the types of valves and connections that may be employed in a boom enclosure 140 such as that depicted in FIG. 3 may be appreciated from the discussion hereabove relating to FIG. 1. Generally, essentially any suitable arrangement of valves, connections and the like may be employed to ensure the easily controllable mixing and provision of various fluids such as those shown in tank farm 120 in FIG. 3.

As further illustrated in FIG. 3, a boom enclosure 140 may feed into a boom unit 108 at a deicing/decontamination station or slot (e.g. a station 106 for narrow-body aircraft or 112 for wide-body aircraft), which may preferably include an operator's cab 108*a* mounted at the free end of boom 108*b*. As shown similar boom unit 108 is preferably provided at the other side of the aircraft 110/116. It should be understood that a different boom enclosure (not shown) will preferably feed in to the boom unit 108 from the right-hand side (in the drawing), and will preferably be adapted to provide the same mix of fluid as at the left-hand side. In the case of wide-body aircraft (116), four boom units 108 and boom enclosures 140 may preferably be so configured. To these ends, it should be understood that the valving and other components in each boom enclosure 140, for the purpose of providing a predetermined mixture of fluids for a corresponding boom 108, can preferably be separately controllable with respect to the valving and other components in other boom enclosures, with the understanding that suitable interconnections (e.g., data transmission interconnections) may be provided between boom enclosures at a single station 106/112 so that different boom enclosures may "talk to" one another to ensure that the same fluid mixture is used at each boom 108 at the station 106/112.

Though not shown, a canopy or other suitable type of enclosing arrangement may preferably be provided to permit aircraft 110/116 to be shielded from the elements while the application of fluids is taking place.

As shown in the upper part of FIG. 3, there is also broadly contemplated in accordance with at least one embodiment of the present invention a decontamination/wash down station 141 configured for applying decontamination fluid (130) and/or cleaning fluid (126) to aircraft or other vehicles, such as military aircraft or other vehicles, that are engaged in combat or combat-type exercises. Similar principles are preferably applied as in the case of a station 106/112 such as illustrated in FIG. 3 and described heretofore, in that a freely and flexibly controllable mixture of various fluids may be applied to a vehicle 140 (though a tank is shown in the drawing, it is to be understood that the vehicle in question could also be a military airplane.) In this case, in view of the evolving recognition of the possibility of biological weapons or other contaminants being employed in combat or other situations of aggression, a station is contemplated whereby military aircraft or other vehicles can undergo a thorough and effective decontamination and wash-down to rid the aircraft of vehicle of contaminating substances. Collection and/or disposal of used cleaning fluid can be attended to in essentially any manner deemed suitable for the cleaning fluid being used and/or the substances being removed.

It should be understood that the cleaning fluid indicated at 126 in FIG. 2 could be embodied by any of a number of suitable cleaning fluids for commercial or military uses. Further, it could be embodied by a corrosion control fluid that might be used in coastal areas characterized by corrosive salt air, or in harsh environments prone to corroding the outer surfaces of aircraft or other vehicles.

It should be understood that a station 141 shown in the upper portion of FIG. 3 is normally intended for stand-alone use at strictly military facilities (perhaps even in the field, at a temporary or makeshift military airfield or base) but could conceivably be provided at a conventional airport or airfield in connection with decontamination/deicing systems such as indicated at 106 and 112.

Whatever the type of station contemplated for applying fluids to aircraft or other vehicles, it will preferably be the case that a containment pad 142 will be provided underneath the area where aircraft or other vehicles are to be parked for the receipt of fluids from boom units 108, with suitable piping 144 being provided to direct effluent from the process to a recovery or recycling unit 122. Such a unit 122 may preferably include a lift station 122*a* which assists in the deposition of the effluent into a collection tank 122*b*, thence allowing for options such as recycling, treatment or disposal.

An integrated system such as that just described (in connection with FIGS. 2 and 3) would appear to offer at least the following benefits:

- A single system could be provided at fixed airbases for deicing, decontamination and corrosion control operations.
- An increased throughput of aircraft would be possible, thus reducing the time required to refuel and/or rearm aircraft and return them to action.
- The uniform application of deicing, decontamination and corrosion control fluids, where flow is regulated by the operator, could meet variable mixing requirements.
- Savings in the cost of fluids used to de-ice, decontaminate, and rinse aircraft during military operations are achievable.
- The environmental impact of deicing/decontamination operations could be reduced.
- The level of safety for system operators could be increased (e.g. fewer people required, less vehicular traffic involved, operators in an enclosed cab).
- Greater consistency and quality assurance could be provided in deicing and decontamination operations.

In general recapitulation, it will be appreciated that, conventionally, most de-icing systems involve truck deicers, from which de-icing solution is sprayed or issued onto aircraft. In such a setting, the de-icing solution is made by mixing concentrated de-icing fluid with water at a centralized location. If a change in the mixture is desired at the centralized location, it is often the case that a large quantity of the mixed solution has to be "dumped" between the centralized mixing location and the truck filling station(s), thus resulting in more run-off of the de-icing solution than may be desired, with adverse environmental effect.

The present invention, on the other hand, in accordance with at least one presently preferred embodiment, provides for mixing de-icing fluid with water at individual boom/gantry locations, thus allowing for customized ratios of de-icing fluid to water that are tailored to different aircraft, which may present different demands for de-icing (for example, one airplane may have a much greater accumulation of snow or ice on its exterior than another). This also averts the need to dump copious quantities of de-icing solution every time a change to the mix is desired.

It is presently contemplated, in one embodiment, that the individual mixing locations include a cab-mounted, non-translatable pedestal (i.e., rotatable but otherwise immobile with respect to the airport apron) with a boom extending therefrom. Thus, the equipment for mixing the concentrated de-icing fluid with water would essentially be provided at the location of each individual boom. Controls for regulating the ratio of de-icing fluid to water could be provided at each individual mixing location (e.g., within an enclosure at the base of the boom pedestal) or at a centralized location (e.g. in a fixed building such as the deicing control tower). However, it is also conceivable to extend the present inventive concept to encompass translatable booms, such as truck-mounted booms. Mixing equipment could be provided within the trucks themselves, or could be provided at different, fixed locations along the airport apron (akin to fire hydrants) at which the trucks could "connect up" and serve as conduits for providing deicing solution to the boom or gantry mounted on the truck.

Various conventional aspects of de-icing systems not otherwise described in detail herein, and which may be of use in better understanding the various embodiments of the present invention, may be found in any of several issued U.S. patents, including: U.S. Pat. No. 5,161,753 to Vice et al. (issued Nov. 10, 1992); U.S. Pat. No. 5,096,145, to Phillips et al. (Mar. 17, 1992); and U.S. Pat. No. 4,191,348 (Mar. 4, 1980).

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. All changes which come within the meaning and range of equivalency of the claims are to be embraced within their scope.

What is claimed is:

1. System for applying fluid to aircraft, said system comprising:
   at least one arrangement for directing fluid towards aircraft;
   an input arrangement for providing fluid to said at least one fluid directing arrangement;
   said input arrangement comprising:
   an arrangement for facilitating the mixing of at least two fluids; and
   an arrangement for providing a mixture of at least two fluids to said at least one fluid directing arrangement;
   a control arrangement for selectably controlling the respective proportions of fluids in a mixture of at least two fluids, wherein said control arrangement is adapted to facilitate the selective provision of different fluid mixtures to different aircraft;
   said control arrangement comprising a feedback arrangement for adjusting the respective proportions of fluids in a mixture of at least two fluids substantially in realtime;
   said feedback arrangement comprising a measuring arrangement for measuring the respective proportions of fluids in a mixture of at least two fluids and at least one adjustment arrangement for changing the respective proportions of fluids in a mixture of at least two fluids in response to measurements from said measuring arrangement.

2. The system according to claim 1, wherein said at least two fluids comprise at least two of: water, de-icing fluid, anti-icing fluid, decontaminating fluid and cleaning fluid.

3. The system according to claim 1, wherein said at least two fluids comprise at least two of: water, Type I fluid, Type IV fluid, decontaminating fluid and cleaning fluid.

4. The system according to claim 2, wherein said at least one fluid directing arrangement comprises at least one boom unit.

5. The system according to claim 4, wherein said at least one boom unit comprises at least two boom units.

6. The system according to claim 5, wherein each of said boom units comprises a boom and an operator's cab mounted on said boom.

7. The system according to claim 4, wherein said control arrangement is separate from said at least one boom unit.

8. The system according to claim 7, wherein said control arrangement comprises a control tower separate from said at least one boom unit.

9. The system according to claim 2, further comprising an arrangement for supplying said at least two fluids to said input arrangement.

10. The system according to claim 9, wherein said supplying arrangement comprises a tank farm, said tank farm comprising a plurality of tanks each for containing a different fluid.

11. The system according to claim 1, further comprising a containment pad for directing away used fluid.

12. The system according to claim 11, further comprising a recovery unit for accepting used fluid from said containment pad.

13. System for applying fluid to military vehicles, said system comprising:
   at least one arrangement for directing fluid towards a military vehicle;
   an input arrangement for providing fluid to said at least one fluid directing arrangement;
   said input arrangement comprising:
   an arrangement for facilitating the mixing of at least two fluids, one of said at least two fluids comprising decontaminating fluid or cleaning fluid; and
   an arrangement for providing a mixture of at least two fluids to said at least one fluid directing arrangement;
   a control arrangement for selectably controlling the respective proportions of fluids in a mixture of at least two fluids, wherein said control arrangement is adapted to facilitate the selective provision of different fluid mixtures to different military vehicles;
   said control arrangement comprising a feedback arrangement for adjusting the respective proportions of fluids in a mixture of at least two fluids substantially in realtime;
   said feedback arrangement comprising a measuring arrangement for measuring the respective proportions of fluids in a mixture of at least two fluids and at least one adjustment arrangement for changing the respective proportions of fluids in a mixture of at least two fluids in response to measurements from said measuring arrangement.

14. The system according to claim 13, wherein said at least two fluids comprise at least two of: water, de-icing fluid, anti-icing fluid, decontaminating fluid and cleaning fluid.

15. Method of applying fluid to aircraft, said method comprising the steps of:
   mixing at least two fluids;
   directing the mixture of at least two fluids towards aircraft; and
   selectably controlling the respective proportions of fluids in the mixture of at least two fluids, whereby the selective provision of different fluid mixtures to different aircraft is facilitated;
   said controlling step comprising adjusting the respective proportions of fluids in a mixture of at least two fluids substantially in realtime;
   said adjusting step comprising measuring the respective proportions of fluids in a mixture of at least two fluids and changing the respective proportions of fluids in a mixture of at least two fluids in response to measurements taken from said measuring.

16. The method according to claim 15, wherein the at least two fluids comprise at least two of: water, de-icing fluid, anti-icing fluid, decontaminating fluid and cleaning fluid.

17. The method according to claim 15, wherein said at least two fluids comprise at least two of: water, Type I fluid, Type IV fluid, decontaminating fluid and cleaning fluid.

18. The method according to claim 16, further comprising the step of providing at least one boom unit for performing said step of directing the mixture of fluids towards aircraft.

19. The method according to claim 18, wherein said step of providing at least one boom unit comprises providing at least two boom units.

20. The method according to claim 19, wherein each of the boom units comprises a boom and an operator's cab mounted on the boom.

21. The method according to claim 18, further comprising the step of providing a control arrangement for performing said step of selectably controlling the respective proportions of fluids and disposing the control arrangement separately from said at least one boom unit.

22. The method according to claim 21, wherein said step of providing a control arrangement comprises providing a control tower separate from the at least one boom unit.

23. The method according to claim 16, further comprising the steps of:
providing an arrangement for facilitating said step of mixing at least two fluids; and
providing an arrangement for supplying said at least two fluids to said input arrangement.

24. The method according to claim 23, wherein said step of providing a supplying arrangement comprises providing a tank farm, said tank farm comprising a plurality of tanks each for containing a different fluid.

25. The method according to claim 15, further comprising the step of directing away used fluid.

26. The method according to claim 25, further comprising the step of providing a recovery unit for accepting used fluid from said containment pad.

27. Method of applying fluid to military vehicles, said method comprising the steps of:
mixing at least two fluids, one of said at least two fluids comprising decontaminating fluid or cleaning fluid;
directing the mixture of at least two fluids towards at least one military vehicle; and
selectably controlling the respective proportions of fluids in a mixture of at least two fluids, whereby the selective provision of different fluid mixtures to different military vehicles is facilitated;
said controlling step comprising adjusting the respective proportions of fluids in a mixture of at least two fluids substantially in realtime;
said adjusting step comprising measuring the respective proportions of fluids in a mixture of at least two fluids and changing the respective proportions of fluids in a mixture of at least two fluids in response to measurements taken from said measuring.

28. The method according to claim 27, wherein said at least two fluids comprise at least two of: water, de-icing fluid, anti-icing fluid, decontaminating fluid and cleaning fluid.

29. The system according to claim 1, wherein said adjustment arrangement comprises valving for changing the respective proportions of fluids in a mixture of at least two fluids.

30. The system according to claim 29, wherein said valving comprises a first control valve for regulating the flow of one of said fluids and a second control valve for regulating the flow of another one of said fluids.

31. The system according to claim 1, wherein said measuring arrangement comprises at least one refractometer.

32. The system according to claim 31, wherein said measuring arrangement comprises two refractometers, each corresponding to a different one of said fluids.

33. The system according to claim 1, wherein said at least two fluids comprise water and at least one of: de-icing fluid and anti-icing fluid.

34. The system according to claim 1, wherein said at least two fluids comprise water and at least one of: Type I fluid and Type IV fluid.

35. The system according to claim 13, wherein said adjustment arrangement comprises valving for changing the respective proportions of fluids in a mixture of at least two fluids.

36. The method according to claim 15, wherein said adjustment arrangement comprises valving for changing the respective proportions of fluids in a mixture of at least two fluids.

37. The method according to claim 36, wherein said valving comprises a first control valve for regulating the flow of one of said fluids and a second control valve for regulating the flow of another one of said fluids.

38. The method according to claim 15, wherein said measuring arrangement comprises at least one refractometer.

39. The method according to claim 38, wherein said measuring arrangement comprises two refractometers, each corresponding to a different one of said fluids.

40. The method according to claim 15, wherein said at least two fluids comprise water and at least one of: de-icing fluid and anti-icing fluid.

41. The method according to claim 15, wherein said at least two fluids comprise water and at least one of: Type I fluid and Type IV fluid.

42. The method according to claim 27, wherein said adjustment arrangement comprises valving for changing the respective proportions of fluids in a mixture of at least two fluids.

* * * * *